United States Patent
Sabat, Jr. et al.

(10) Patent No.: US 6,560,441 B1
(45) Date of Patent: May 6, 2003

(54) LOW NOISE IN-BUILDING DISTRIBUTION NETWORK FOR WIRELESS SIGNALS

(75) Inventors: John Sabat, Jr., Merrimack, NH (US); John H. Oates, Amherst, NH (US); Thomas J. Johnson, Bedford, NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 09/548,878

(22) Filed: Apr. 13, 2000

Related U.S. Application Data
(60) Provisional application No. 60/129,433, filed on Apr. 15, 1999.

(51) Int. Cl.$^7$ .................................................. H04B 7/00
(52) U.S. Cl. ........................... 455/14; 422/517; 422/523
(58) Field of Search ................................ 455/422, 426, 455/450, 452, 14, 523, 517, 63; 370/335, 329

(56) References Cited

U.S. PATENT DOCUMENTS
5,602,834 A  2/1997  Dean et al. ................. 370/335

FOREIGN PATENT DOCUMENTS
EP  0 562 825 A1  9/1993
GB  2300 333 A  10/1996

*Primary Examiner*—Thanh Cong Le
(74) *Attorney, Agent, or Firm*—Hamilton, Brook, Smith & Reynolds, P.C.

(57) ABSTRACT

A solution for providing an improved fading margin environment for in-building wireless coverage. An optical fiber or other available broadband signal distribution network is used to distribute signals between centrally located base transceiver station (BTS) equipment and remotely located transceiver equipment referred to herein as a cable microcell integrator (CMI). The CMIs are deployed in a configuration to provide radio frequency coverage in a desired microcell area such as a building floor. In a preferred embodiment, a leaky coaxial cable is used as a radiating element within the microcell.

8 Claims, 10 Drawing Sheets

| PARAMETERS | | CALCULATIONS | |
|---|---|---|---|
| PROCESSING GAIN | 85.33 (19.3 dB) | POLE POINT[1] | 54.1 |
| SECTORIZATION GAIN (SG) | 3 | USER (MAXIMUM) | 35.2 |
| VOICE ACTIVITY FACTOR (VAF) | 0.4 | USER (NOMINAL) | 24 |
| OTHER CELL INTERFERENCE FACTOR (INT) | 0.6 | | |
| $E_b/N_0$ | 2.51 (4.0 dB) | | |
| MAXIMUM LOADING | 65% | | |
| MAXIMUM CALL BLOCKING | 1% | | |

[1] POLE POINT $= \dfrac{\text{PROCESSING GAIN}}{\frac{3}{SG} \cdot VAF \cdot (1+INT) \cdot E_b/N_0} + 1$

FIG. 8

LOW NOISE IN-BUILDING DISTRIBUTION NETWORK FOR WIRELESS SIGNALS

RELATED APPLICATION(S)

This application claims the benefit of U.S. Provisional patent application Ser. No. 60/129,433 filed Apr. 15, 1999 and is incorporated herein by reference.

BACKGROUND OF THE INVENTION

The present invention relates generally to wireless communication systems and in particular to a system for distributing wireless system signals between a central base station and remotely deployed transceiving equipment.

Wireless communication networks, such as cellular mobile telephone and Personal Communications Services (PCS), continue to enjoy wide spread growth and popularity. There is often times a need in such systems to provide increasingly greater call handling capacity, as well as to accommodate higher peak usage. Emerging Personal Communication Services (PCS) networks, presently still in the stages of being implemented, demand additional design considerations such as low build out cost as they must compete with entrenched cellular networks.

Several approaches have been adopted for deploying such networks. One approach is to increase the coverage area afforded by a given system by increasing the antenna tower height and transmit power level beyond conventionally accepted norms. However, such solutions often increase the number of "blind" spots in areas that include a number of tall buildings, hills, or other natural obstructions to radio propagation.

Alternatively, a relatively large number of base stations may be deployed with smaller radio coverage "footprints". While this avoids blind spots, it greatly increases the total capital cost for base station transceiving equipment which may be $200,000 or more per cell site.

Rather than deploy base station equipment in each relatively small cell (which would be relatively cost prohibitive), broadband distribution cable and/or fiber optic networks can be used to connect the antennas to centrally located base station equipment. For example, a suggestion has been made in U.S. Pat. No. 5,381,459 to use cable television networks to distribute wireless communication signals between base transceiver system (BTS) equipment and remote transceiver sites located at each cell. This approach couples the transceiver signals over an existing coaxial cable television network using time or frequency division multiplexing in order to avoid interference with the other signals being carried by the cable, such as cable television (CATV) signals.

Recently, other types of broadband distribution networks have also been proposed. Such networks consist of optical fiber transmission media which can directly distribute signals between centrally located base transceiver system (BTS) equipment and remotely located transceiver equipment. See, for example, our co-pending U.S. patent application Ser. No. 09/256,244 entitled "Optical Simulcast Network with Centralized Call Processing," filed Feb. 23, 1999.

There is also presently a demand by the customers of such cellular telephone systems for digital modulation techniques, such as Code Division Multiple Access (CDMA). In these CDMA systems, such as the IS-95B system being used widely in the United States a common frequency band is used to support communication between multiple mobile subscriber units and base stations. With this technique, signals occupying a common carrier frequency are discriminated at a receiving terminal (which may either be the base station or is the mobile unit) based on the use of pseudo random noise (PN) codes. In particular, transmitting terminals use different PN codes or PN code phase offsets to produce signals that may be separately received. The mobile unit is then provided with a list of carrier signal codes and phase offsets corresponding to neighboring base stations surrounding the base station through which communication is established. The mobile unit is also equipped with a searching function that allows it to track the strength of the carrier signals generated from a group of the neighboring base stations.

The carrier signal power levels used with most cellular and PCS systems are selected to work with mobile units that travel among cells that provide coverage over an area of several miles, such as is typically encountered along a suburban highway. However, certain other challenges are presented when attempting to provide coverage in a densely populated city and/or in other environments where coverage is to be limited to a building. Within such environments, signal reflections off of building infrastructure are quite common, and typical signal fading studies prove that line-of-sight (LOS) propagation is not typically the dominant propagation mode. This is in distinct contrast to the typical situation in a suburban environment where a line-of-sight does typically exist between the mobile subscriber unit and the neighboring base stations. Within the building, metal, concrete, and other structures typically provide a signal fading characteristic for over-the-air propagation which in turn requires the wireless signal transmissions to be carried out at power levels which must be higher than would otherwise be necessary. This in turn has negative effect on the ability of the wireless system as a whole to provide service to a maximum number of users. This situation is particularly acute in systems that make use of CDMA-type signalling in which the overall system capacity is a function of the interference generated by individual signal power outputs required for individual subscribers.

SUMMARY OF THE INVENTION

The present invention is a solution for providing an improved fading margin environment for in-building wireless coverage. An optical fiber or other available broadband signal distribution network is used to distribute signals between centrally located base transceiver station (BTS) equipment and remotely located transceiver equipment referred to herein as a cable microcell integrator (CMI). The CMIs are deployed in a configuration to provide radio frequency coverage in a desired microcell area such as a building floor. In a preferred embodiment, a leaky coaxial cable is used as a radiating element within the microcell.

In a preferred embodiment, a radio frequency signal splitter or power divider is used with each CMI to divide transmit power evenly to a pair of leaky coaxial radiating elements run along each of the sides of a building floor. A duplexer is then used to combine the receive link signals with the transmit link signals. The combined signal on the duplexer port is then in turn coupled to the radiating coaxial cables.

In a preferred embodiment, the leaky coaxial cable may be strung above ceiling tiles, out of sight, or may be mounted as radio frequency propagation strips along the metal guides for suspended ceilings.

The radiating leaky coaxial cable selected is typically one-half inch plenum rated 50 ohm coaxial cable with radiating apertures located along its link. The leaky coaxial cable can be terminated with a five watt load or further antenna element.

There are several advantages that result from using the leaky coaxial cable with relatively high power transmit levels inside a building.

Complete coverage of the building floor is provided while changing the fading characteristics of the RF signals. In particular, the fading characteristics of the building now more closely approximate line-of-sight type coverage areas as opposed to the multi-path environment typically encountered in a building.

A second advantage results from the use of a primary receive port for one side of a building floor and a diversity receive port for another side of the building floor. The lack of a second diversity reception port within the building has been found not to be a detriment to system performance since the multi-path environment, along with the reception properties of the leaky coaxial cable itself creates a multiple delayed signal versions that are received back a rake receiver at the base station. This allows for optimal signal ratio combining with the various fingers of the receiver operating similarly to diversity receivers. Therefore, by breaking a building into two distinct microcell regions, interference generated by the mobile subscriber units can be further reduced.

Also, in the preferred embodiment, a single CMI can provide coverage to multiple floors or multiple sections of the same floor. In such cases, signal power may be split at the CMI to explicitly feed radio frequency energy to each floor section. In a case where two different floors of a building are fed from the same CMI, floor penetration loss of the radio signals is not incurred. Rather, floor penetration is instead used to help provide separation between the microcells thereby created, mitigating interference between such sectors.

In this manner, radio coverage is encouraged to remain line-of-sight so that fading characteristics remain benign. The two receive channels can therefore be used to greater advantage by allowing them to cover different parts of the building. This also provides an advantage to the signal powers on the reverse link as the power is also split in that signal propagating direction as well.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
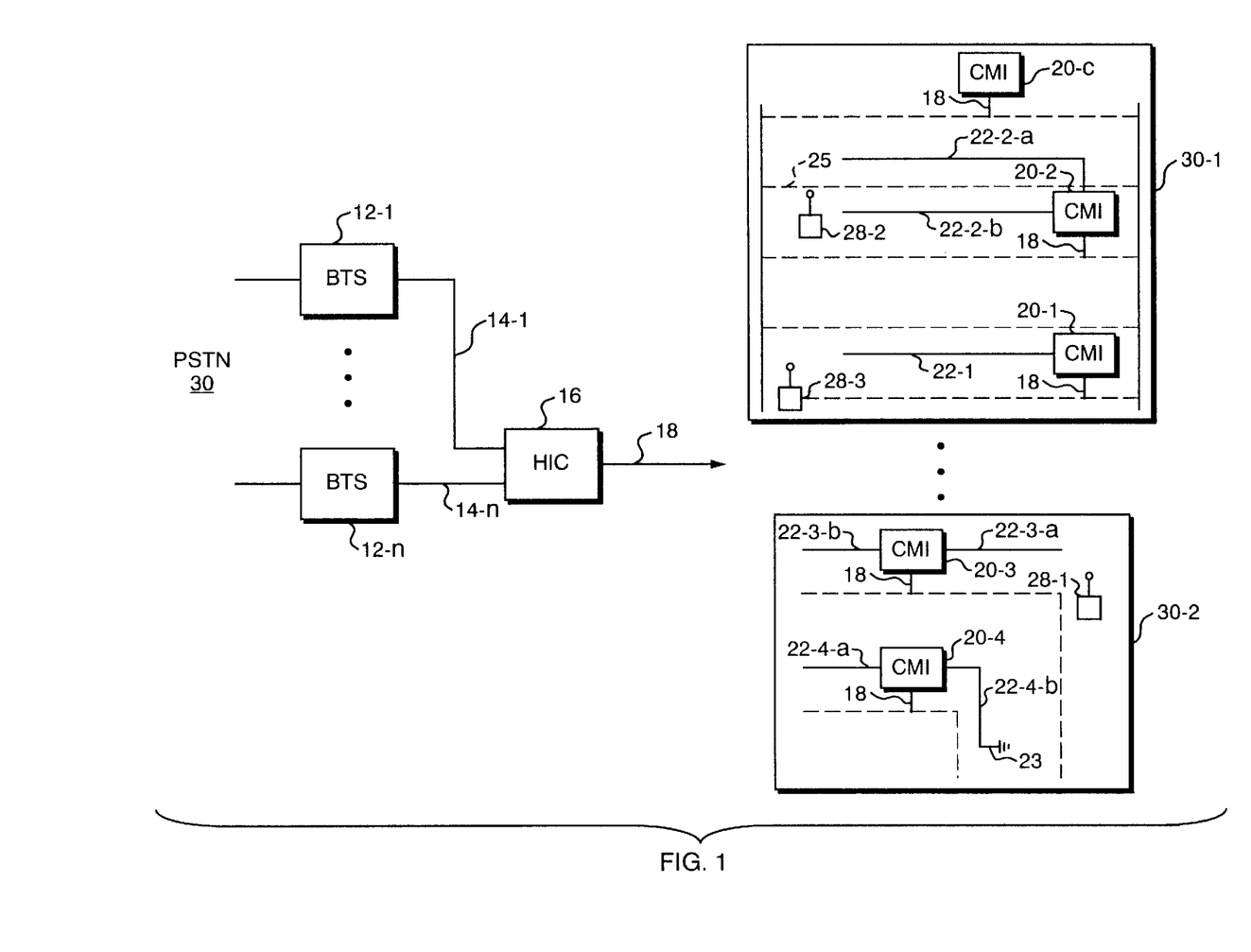
FIG. 1 is a block diagram of a wireless signal distribution system that makes use of a broadband distribution network with leaky radiating coaxial cable to provide radio coverage according to the invention.

Turning attention now to the drawings more particularly, FIG. 1 is a block diagram of the components of a wireless communication system such as a Personal Communication System (PCS), or other cellular mobile telephone system, in which broadband wired distribution media 18 is used to distribute channelized radio frequency signals upbanded onto one or more carriers as one or more simulcast groups, and then radiated into microcells using leaky coaxial cable radiators 22.

The system 10 includes one or more conventional base transceiver stations (BTSs) 12-1, . . . , 12-n, a Hub Interface Converter (HIC) 16, and a number of Cable Microcell Integrators (CMIs) 20-1, 20-2, . . . , 20-c. As described in more detail below, each CMI 20-1 has associated with it up to three antenna connection ports. The first antenna connection is used for a transmitter antenna. The second antenna connection is used for a primary reception antenna, and an optional third antenna connection is used for a secondary reception antenna.

More particularly now, the BTSs 12-1 . . . 12-b are each coupled to the HIC 16 using appropriate radio frequency (RF) transmission wired media, such as coaxial cables 14-1, 14-n. The HIC 16 is physically located at the same centralized location as the BTSs 12.

The HIC 16 is also coupled to each of the remotely located CMIs 20-1, 20-2, . . . , 20-c using an appropriate broadband distributed network 18. In the preferred embodiment, the distribution network 18 is an optical fiber based network; it should be understood that other types of physical media such as cable television signal distribution networks may be used as well.

The system 10 provides voice and/or data traffic signals between subscriber units, such as hand-held subscriber units 28-1, 28-2, and 28-3. Specifically, the system 10 provides traffic signals between subscriber units 28 and a network, such as the public switched telephone network (PSTN) 30. In a particular embodiment of the invention are described herein, the signaling protocol (also known as the "air interface") between the base transceiver stations (BTS) 12 and the subscriber units 28 may, for example, be the Code Division Multiple Access (CDMA) IS-95B standard promulgated by the Telecommunications Industry Association (TIA) in the United States.

The CMIs 20 in the illustrated embodiment are each associated with a small area of a building 30 or microcell. For example, an exemplary CMI 20-1 is associated with a floor of a building 30-1. CMI 20-1 is thus responsible for receiving radio signals from a subscriber unit 28-3 located within that floor and forwarding them to one of the associated BTSs 12. Likewise, radio signals originating at one of the BTSs 12 and intended for the subscriber unit 28-3 are forwarded through coaxial cable 14, HIC 16, over the optic fiber 18, to respective CMI 20-1.

As shown in FIG. 1 in the illustrated embodiment, the invention is used to provide radio frequency (RF) coverage for the wireless system 10 by using leaky coaxial cable radiators 22 which are coupled to the antenna connection ports of the CMIs 20. For example, in a first building 30-1, which is a high rise building, a first CMI 20-1 is located on a first floor. A network connection port of a CMI 20-1 provides connections to the broadband wire distribution media 18. The leaky coaxial cable 22-1 is then coupled to the transmit and receive ports of the CMI 20-1. The leaky radiating coaxial cable 22-1 may be, for example, standard coaxial 50 ohm cable of the one-half Plenum-rated variety, with radiating apertures located along its length.

In another area of the building 30-1, such as an upper pair of floors, a single CMI 20-2 may have a pair of radiating coaxial cables 22-2-a and 22-2-b strung along separate floors. The respective radiating cables 22-2-a and 22-2-b are coupled to respective ones of the primary and optional secondary reception antenna ports of the single CMI 20-2. The pair of radiating cables 22-2-a and 22-2-b may share the transmit port on the CMI 20-2. The manner of interconnecting the pair of radiating cables 22-2-a and 22-2-b with the three antenna ports of the CMI 20-2 is discussed in greater detail in connection with FIG. 5.

In another scenario, the invention may be used in a low rise building such as building 30-2, of which a top plan view is shown in FIG. 1. In this scenario, a CMI 20-3 may be deployed at a central location of the building such as in the middle of a corridor. The leaky coaxial radiator pair 22-3-a and 22-3-b may be strung along in opposite directions from the CMI 20-3, along a corridor. In other areas of the building, such as at CMI 20-4, one of the leaky coaxial radiators 22-4-a may be strung along a corridor as before, but the second leaky coaxial radiator 22-4-b may be located around a corner from the CMI 22-4.

In some instances, such as for the leaky coaxial radiator 22-4-b, an antenna 23 provides termination for the leaky radiator 22; in other instances, the coaxial radiators 22 may be terminated with a five watt load (not shown) in FIG. 1.

In either environment, the coaxial radiating cables 22 may be typically strung above ceiling tiles out of sight within the buildings 30. In the case of a building 30-1 having multiple floors, the CMI 20-2 may provide radio frequency coverage to multiple floors by splitting the power at the CMI 20-2 to explicitly feed to each respective floor covered by the cables 22-2-a and 22-2-b. In this way, the need for penetration of radio frequency energy between the floor 25 separating the regions of coverage is avoided.

With the leaky radiators 22, radio frequency coverage is provided in a line-of-sight (LOS) manner so that fading characteristics experienced by the subscriber units 28 are quite different from the typical in-building situation. In particular, using either the scenario of the multiple story building 30-1 or single story building 30-2, by stringing the leaky coaxial cables 22 to define the microcell, inbuilding fading characteristics more closely resemble a line-of-sight propagation characteristics more typical of outdoor, suburban, high power applications. Even in an instance such with as the CMI 20-2 or 20-3, the lack of a second diversity reception port is not typically a detriment to good RF reception. This is likely because the multi-path environment created by the physics of the building, along with the reception characteristics of the leaky coaxial radiators 22, creates multiple delayed versions of the RF signals received at the BTS 12. This allows a standard rake type receiver located within the BTS 12 to perform optimal ratio combining with various tuned rake fingers, similar to an instance in which explicit diversity signals are carried back to the BTS 12.

Figure 2:
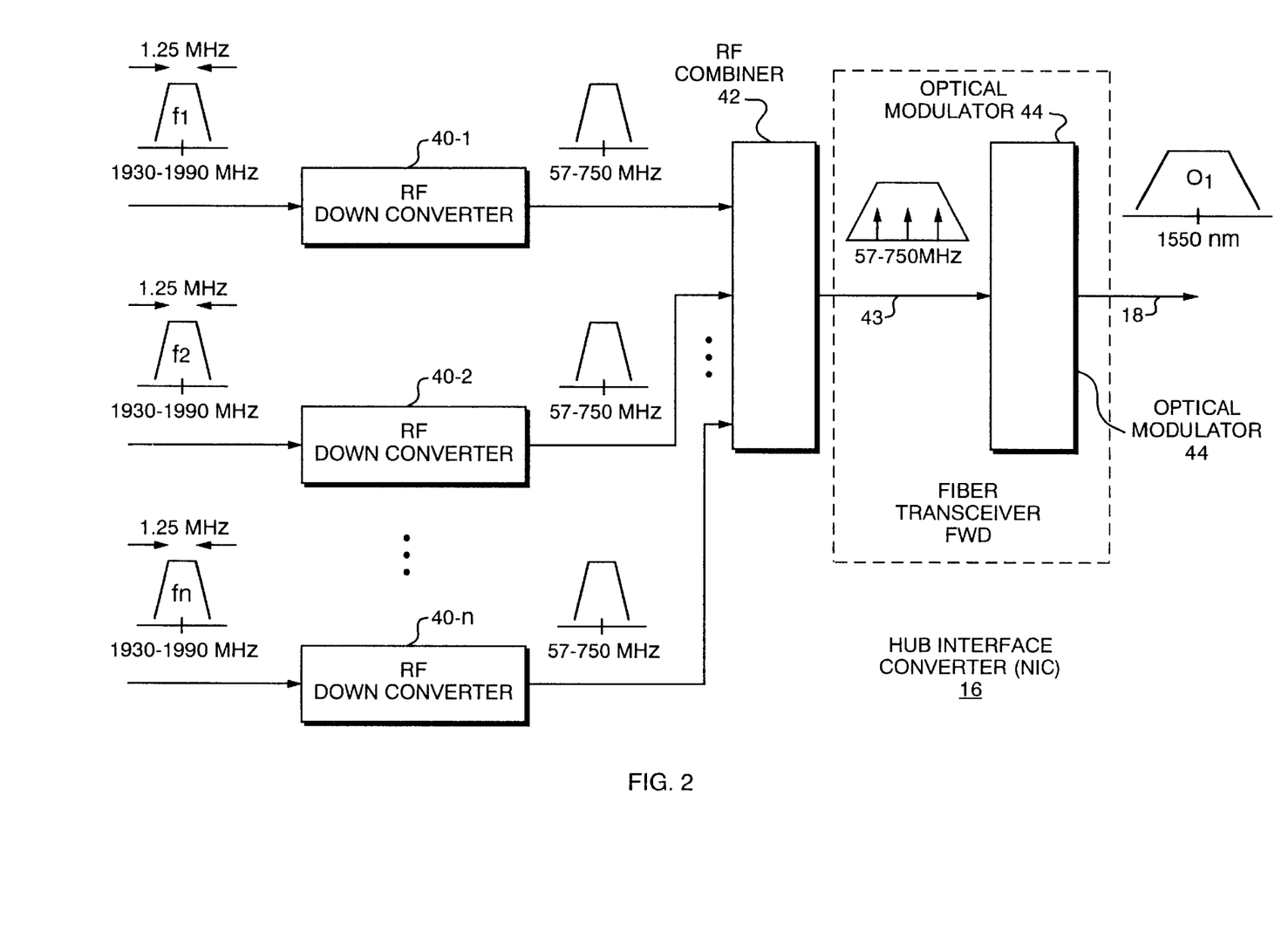
FIG. 2 is a more detailed block diagram of a forward link portion of a fiber node deployed at a central hub interface converter (HIC).

The HIC 16 is shown in more detail in FIG. 2. In this particular view, the portion associated with implementing the forward signalling direction, namely the direction of transmission of signals from the BTSs 12 out to the CMIs 20, is illustrated. That portion is seen to include a number of radio frequency (RF) down converters 40-1, 40-2, . . . , 40-n that couple to an RF combiner 42 which in turn feeds an optical modulator 44. The optical modulator 44 provides the forward link direction component of a fiber optic transceiver 45.

An exemplary RF down converter 40-1 receives the RF signals generated by an associated BTS 12-1 and translates their carrier frequency to a carrier frequency in a range more typical of cable distribution networks. In the illustrated embodiment, the RF down converter 40-1 accepts a 1.25 MHz bandwidth signal, which according to the CDMA wireless interface standard in the forward direction may exist at an RF carrier in a range from 1930–1990 MHz, and converts the RF energy to a lower intermediate frequency (IF) in the range of from, for example, 57–750 MHz. In the illustrated embodiment, the BTS 12-1 has provided signals at a carrier frequency f1 in the range indicated and a second base station 12-2 has provided a signal of 1.25 MHz at a different carrier frequency f2 but still within the forward link range of 1930–1990 MHz typical of the PCS band.

There is typically a single RF down converter 40 associated with each BTS 12; however, it should be understood that various other scenarios are possible. For example, the function of the RF combiner 42 may be provided prior to the down conversion process implemented by the elements 40.

The RF combiner 42 accepts the down converted RF signals produced by the down converters 40-1 . . . 40-2 . . . 40-n to produce a single combined RF signal 43. The combined RF signal still contains signal components limited to within a 6 MHz bandwidth within the range of 57–750 MHz, containing the carrier frequencies f1, f2, . . . , fn. It should be understood in accordance with the above discussion that a given RF signal of 1.25 MHz on a given carrier frequency f1 may actually contain multiple traffic channels implemented with different codes c1, c2, . . . , $c_Q$ or even code phases p1, p2, . . . , pz. The combined RF signal 43 is then provided to the optical modulator 44 and upbanded to an optical frequency such as at a carrier wavelength of 1550 nanometers (nm) appropriate for transmission over the optic fiber 18.

Figure 3:
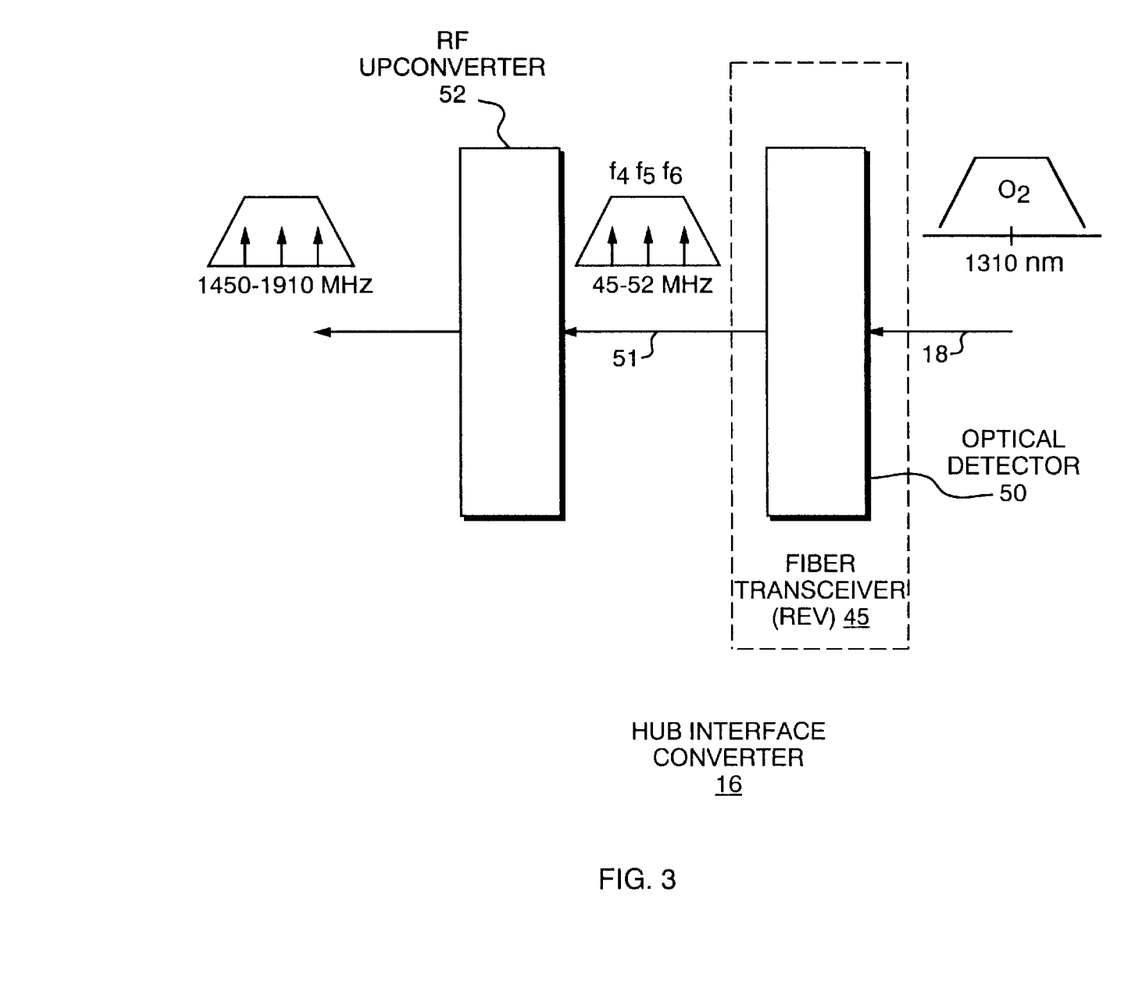
FIG. 3 is a more detailed block diagram of a reverse link direction portion of the system.

FIG. 3 shows the reverse direction portions of the HIC 16 in more detail. In particular, an optical detector 50 accepts signals from the fiber 18 as received from multiple CMIs 20 in the various sectors 24. Such signals may, for example, be optically modulated onto a single optical carrier within a wavelength range of 1310 nanometers. The optical detector 50 then provides a conversion of the energy in the optical band down to a convenient intermediate frequency (IF) band such as in the range from 5–52 MHz. The optical detector 50 serves as the receiver or reverse link portion of the optical transceiver 45. The combined RF signal 51 produced by the optical detector 50 may therefore contain information at a number of carrier frequencies f4, f5, . . . , fm.

The RF upconverter 52 in turn translates such signals to a band within the PCS band used for reverse wireless transmission such as from 1850–1910 MHz as suitable for coupling to the standardized base transceiver system 12.

Figure 4:
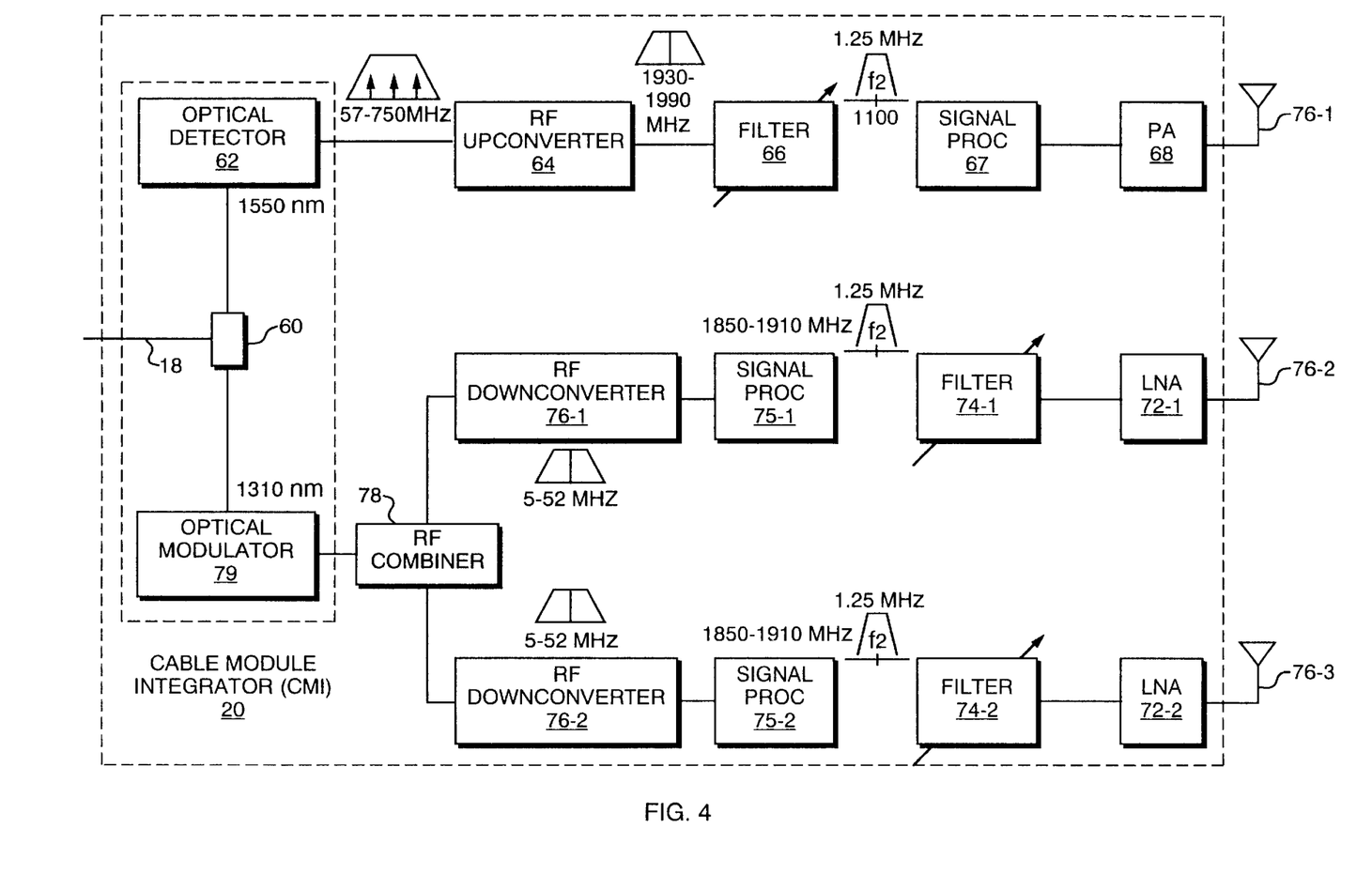
FIG. 4 is a more detailed block diagram of a cable microcell integrator (CMI).

Turning attention to FIG. 4, the details of the CMI 20 on the forward link will now be addressed. The 1550 nm signal received from the optic fiber 18 is first fed to a splitter 60 to allow a portion of the optical energy to be fed to an optical detector 62. The optical detector 62 in the preferred embodiment accepts optical signals in a range of, for example, 1550 nanometers providing a detected signal in a 60 MHz wide forward link band at the 57–750 MHz IF carrier. This signal, which may contain the multiple RF carriers f1, f2, . . . , fn, codes or code phases as previously described, is then fed to the RF upconverter 64. The optical detector 62 and an optical modulator 79 provide an optical transceiver 80 for the CMI 20.

The output of the RF upconverter 64 is the radio frequency signal in the expected forward link range of from 1930–1990 MHz. A filter 66 restricts the transmission bandwidth to the single channel frequency bandwidth of approximately 1.25 MHz. A signal processor 67 may provide further filtering, automatic gain control, pre-amplification, or control signaling functions.

In the receive, or reverse link direction, signals received on the primary reception antenna 26-2 are first fed to a low noise amplifier 72-1 and filter 74-1. Such signals of interest are in the range of 1850–1910 MHz which are the frequency band typically associated with reverse links in the PCS region. The filter 74-1 thus produces a band limited signal of 1.25 MHz that may have multiple carriers, codes and/or phases as previously described. The signal processor 75-1 prepares such signals for RF down conversion to the IF band from 5–52 MHz.

Signals for the secondary or diversity antenna 26-3 are fed through associated filter 74-2, signal processor 75-2, and RF down converter 76-2 which perform functions analogous to that of their associated counterparts 72-1, 74-1, 75-1, and 76-1 in the primary chain. In this instance, the RF down converter 76-2 provides a frequency shift which is different than that of RF down converter 76-1 but still within the band of 5–52 MHz. This provides a system 10 with the ability to feed back a diversity antenna signal so that they can be properly processed by the receive side of the BTSs 12. The RF combiner 78 in turn accepts the signals from the RF down converter 76-1 and 76-2 and feeds them to an optical modulator 44 which upbands the information of interest to an optical carrier such as in the range of 1310 nanometers. The optical signal is then fed to the combiner 60 and back to the fiber 18.

It can now be understood how various components such as the HIC 16, single optical fiber cable 18, and cable microcell integrators 20 can be used to manage the transport of signals between the BTSs 12 and devices which radiate within respective sectors 24 or cells 22. Multiple CMIs 20 can thus be assigned to transmit and receive on the same radio frequency channels as a simulcast cluster. In comparison to a traditional distribution network where the full capacity of an RF channel is not fully utilized, the coverage area of a single RF channel may be extended through the simulcast of RF carriers over a common optical fiber. This provides a significant improvement in network efficiency and capacity control. Furthermore, by incorporating optical modulation and detection equipment entirely within the remote CMIs 20 themselves, the difficulties associated with previous hybrid distribution networks requiring the interconnection of both coaxial cables and optical fiber are avoided.

It should also be understood that the particular filters 66, 74-1, and 74-2 deployed in each CMI 20 are chosen to achieve the desired operational effect of the invention. In particular, the filters 66 and 74 need to be set to the appropriate RF carrier frequency so that the CMI simulcast clusters are appropriately implemented. For example, the filters 66 associated with given CMI cluster, such as the cluster 24-1, 24-2, 24-3, will each be tuned to the same RF carrier frequency. Likewise, the filters 74-1, 74-2 associated with such CMIs 20-1, 20-2, 20-3 intended to be part of a cluster are also tuned to the same carrier frequency.

Therefore, reconfiguration of the distribution network such as when a higher capacity system is desired, requires only reconfiguration of the filters 66 and 74. This may be carried out manually, by either implementing such filters as a tunable circuit that may be adjusted by a technician in the field with potentiometers or the like or in a more sophisticated system, it may be programmable such that they may be controlled by control signals provided over the optic fiber 18 and various dedicated control channels within the associated available bandwidth of operation.

Figure 5:
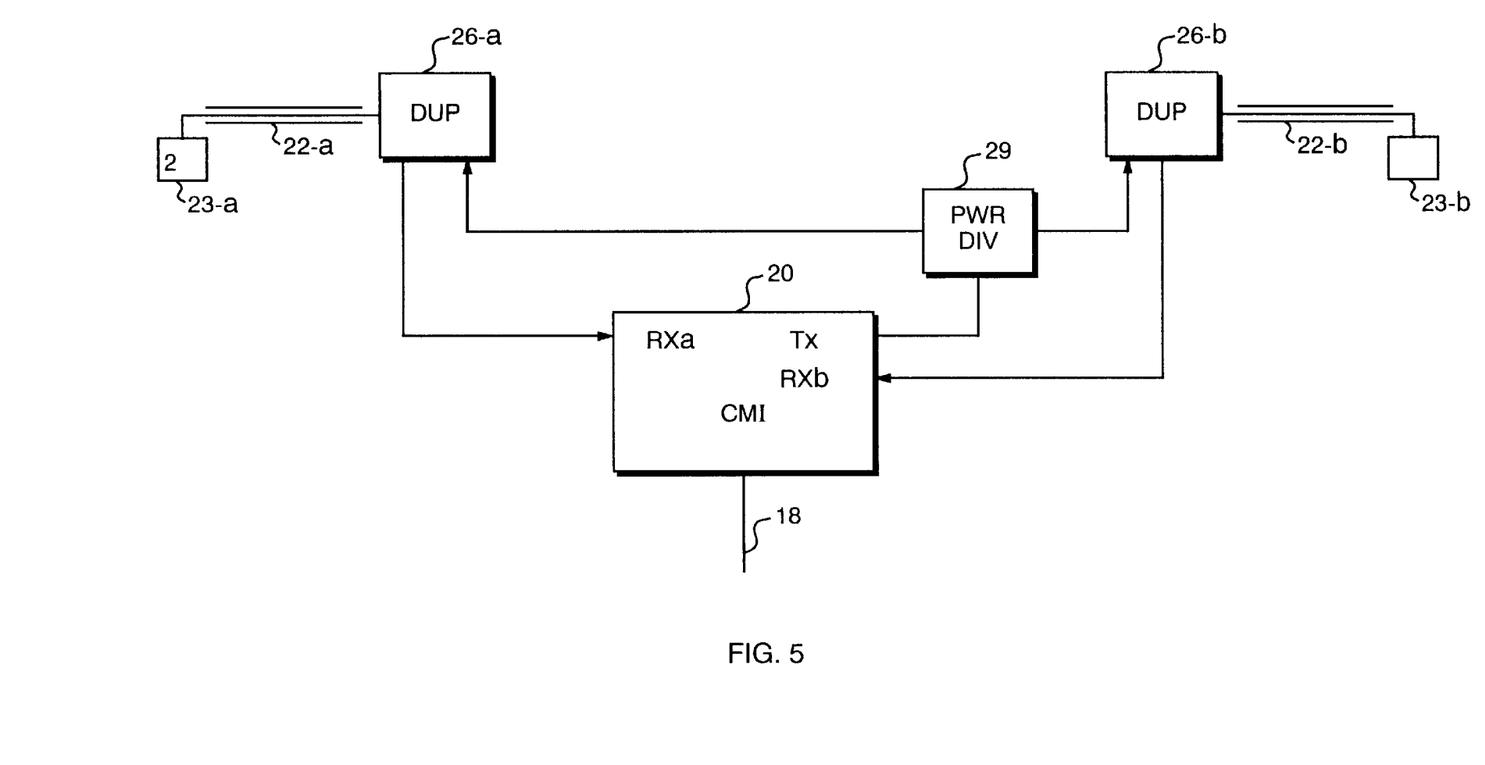
FIG. 5 is a diagram depicting how the cable microcell integrator is interconnected to a pair of leaky coaxial cables.

Now turning attention to FIG. 5, the manner of using each CMI 20 in conjunction with the leaky coaxial radiators 22 to provide coverage within each of the respective microcells will be described in further detail. The illustrated CMI 20 has a first transmit antenna port (Tx) and a pair of receive antenna ports (Rxa, Rxb). A transmit or forward link signal received from the broadband distribution media 18, after being processed by the CMI 20 in a manner already described above, appears at the transmit port Tx. This signal is then fed to a power divider 28 which evenly divides the signal power, feeding it to an input port of a respective one of the pair of duplexers 26-a and 26-b. Each of the respective duplexers 26 has a corresponding signal receive port which is coupled to the respective one of the receive ports Rxa or Rxb of the CMI 20. In this manner, a centrally located CMI 20 may be used to provide even coverage such as along a pair of microcells located within the building, such as respective building floor or on two areas or sides of a single building floor. The combined signal on the duplexer output ports are then fed to respective one of the radiating coaxial cables 22.

As previously mentioned, the coaxial radiators 22 may typically be a leaky, 50 ohm, one-half inch Plenum-rated coaxial cable having radiating apertures located along its length. The respective coaxial cables may be terminated with a respective load 23 such as a five watt load or an antenna (not shown in FIG. 5).

The coaxial radiators 22 may be typically strung along above ceiling tiles out of sight or may be placed as propagating strips along the metal guides used for suspended ceilings.

Figure 6A:
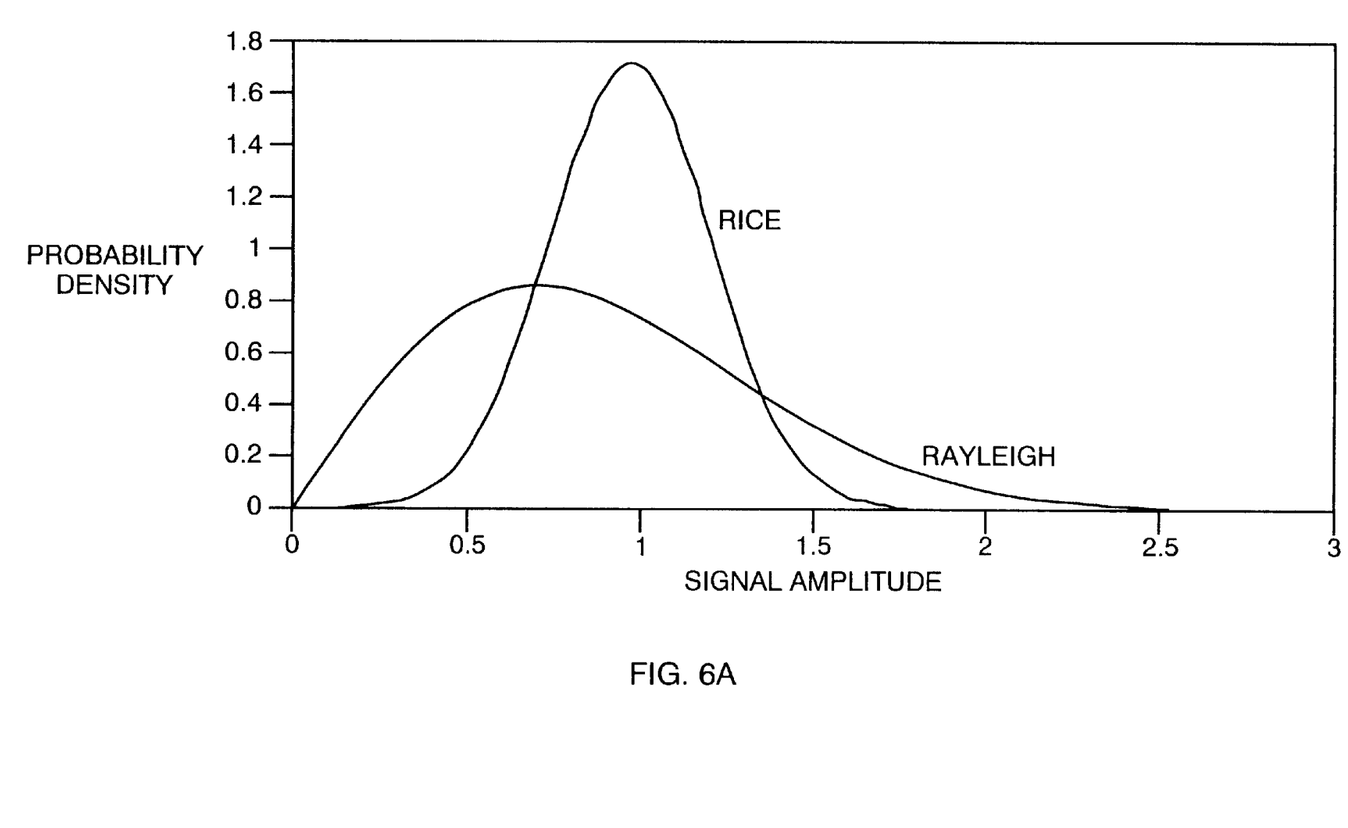
FIGS. 6A and 6B illustrate a comparison of theoretical Rayleigh and Rice amplitude probability and distribution functions.
Figure 6B:
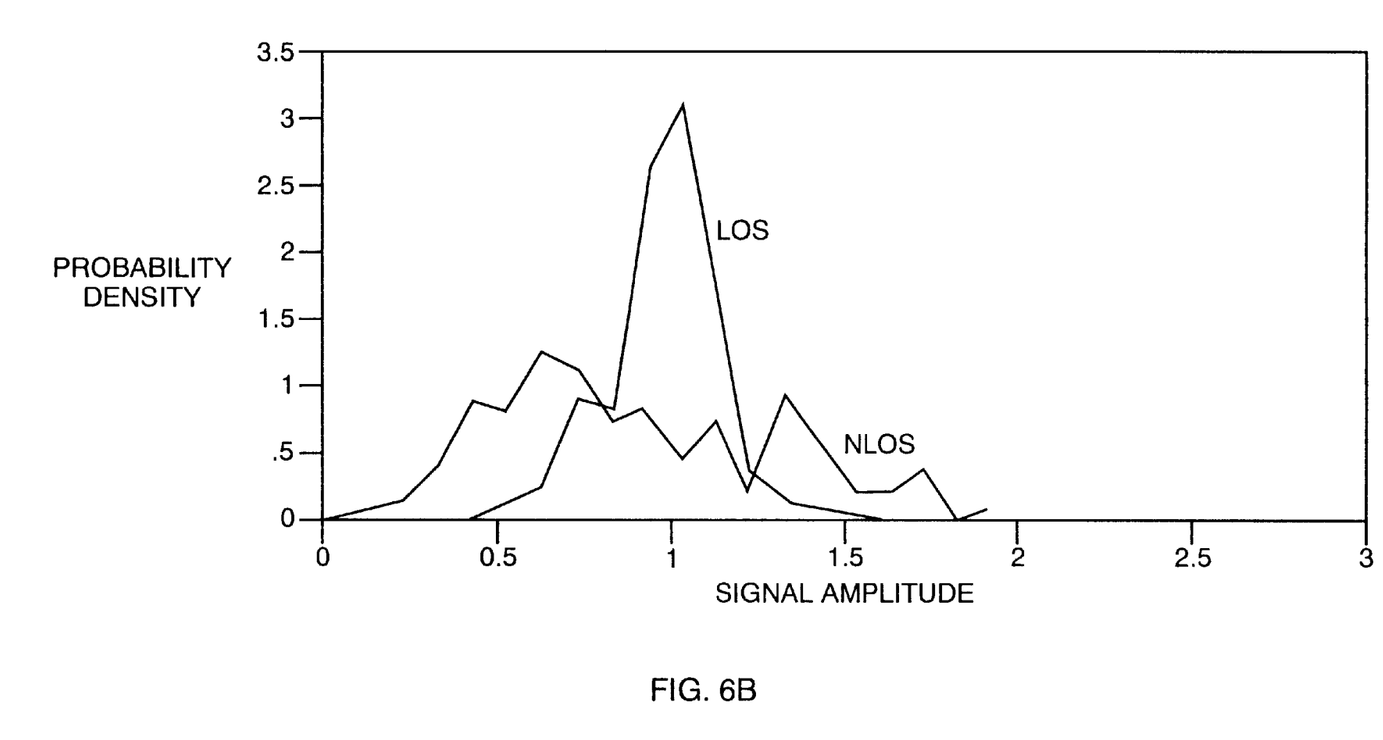

FIGS. 6A and 6B show a comparison of the theoretical Rayleigh and Rice amplitude probability density and distribution functions with those determined from measured data taken in a particular building known as the "Transco Building" in Houston, Tex. An assumption inherent in this fading study is that line-of-sight (LOS) propagation is not present within the building and therefore the resulting amplitude fading is Rayleigh distributed. When a line-of-sight path is present, such as in the case with the leaky coaxial radiators 22 as presented here, the resulting amplitude fading follows more closely the Rice distributed case. For the test performed in the Transco Building, an isolated dipole antenna was used for the transmit function. The illustrated data was used to compare the measured fading statistics for cases where the receiver was and was not within line-of-sight (NLOS) of the transmitter. The measured data in FIG. 6B confirms that the fading is Rayleigh distributed for non-line-of-sight conditions and that the fading is distributed according the Rice distribution for line-of-sight conditions. As can be seen from these figures, the probability of very low amplitude fades is considerably less for the Rice distribution. (Both of the plots assume unity for average signal power.)

Figure 7A:
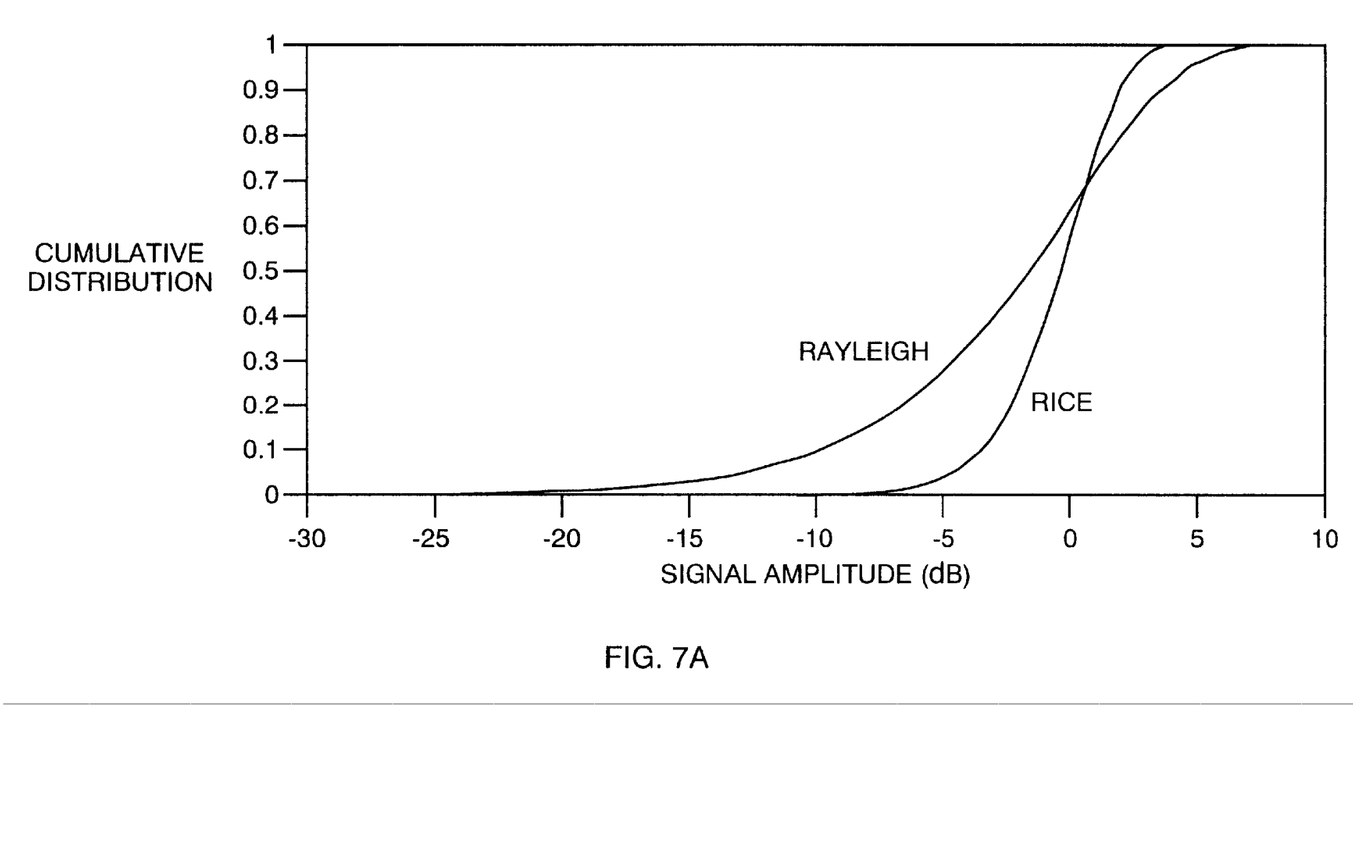
FIGS. 7A and 7B illustrate a comparison of theoretical and experimentally determined amplitude cumulative distribution function.
Figure 7B:
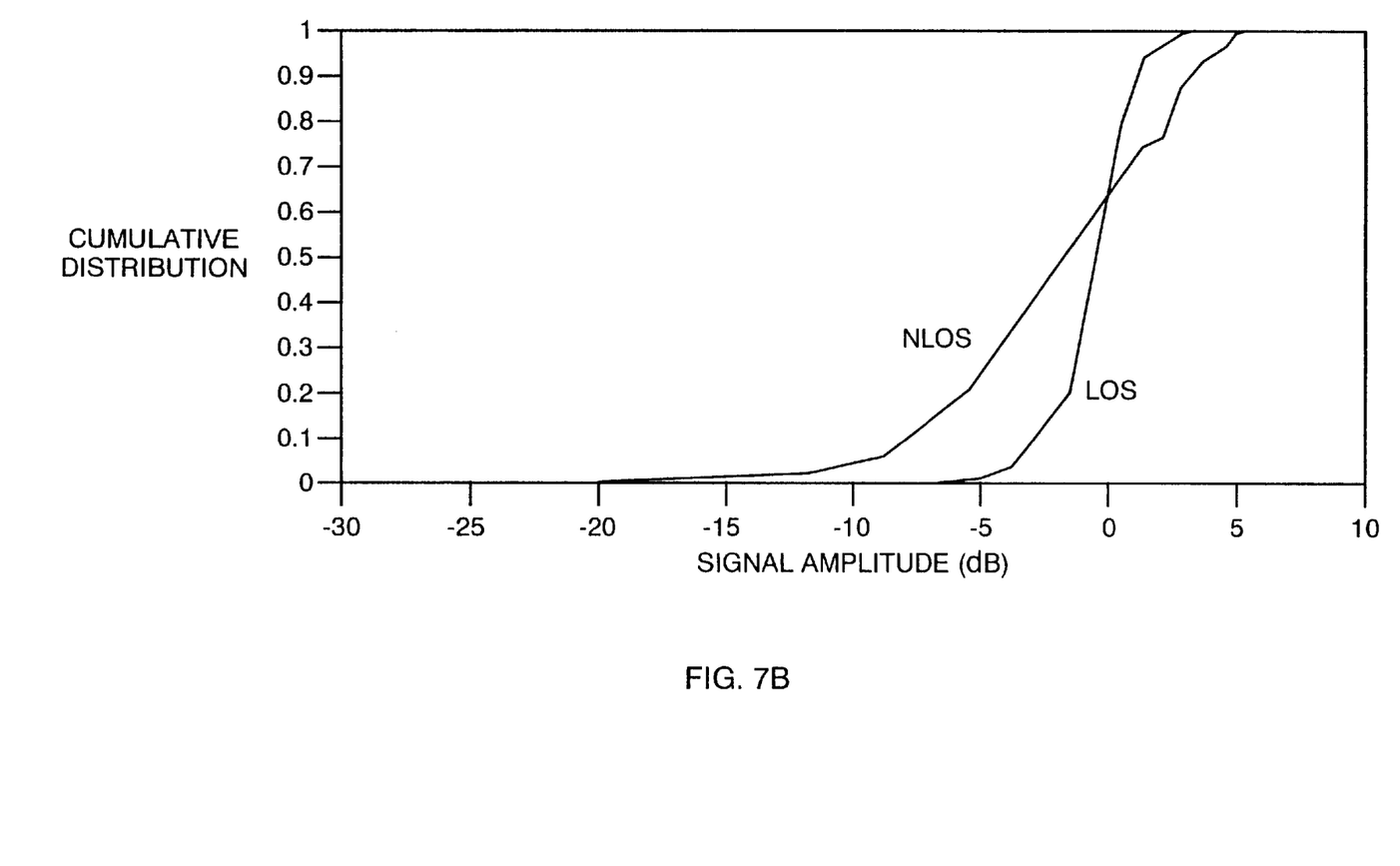

FIGS. 7A and 7B illustrate a comparison of theoretical and experimentally determined amplitude cumulative distribution functions. The experimentally determined distributions follow very closely the theoretical distributions, which shows that the fading is Rayleigh distributed for non-line-of-sight conditions (NLOS) and that the fading is Ricean for line-of-sight (LOS) conditions. This in turn indicates that a much lower signal power normalized in terms of energy per bit over noise energy ($E_b/N_0$) of 4.0 decibels (dB) rather than more typical in-building values of 6.0 dB. It is therefore the case that allowing for the subscriber units 28 to operate a lower power will permit a larger number of subscriber units 28 to be maintained on a given CDMA carrier while still maintaining the same level of quality of the received signal strengths.

Figure 8:
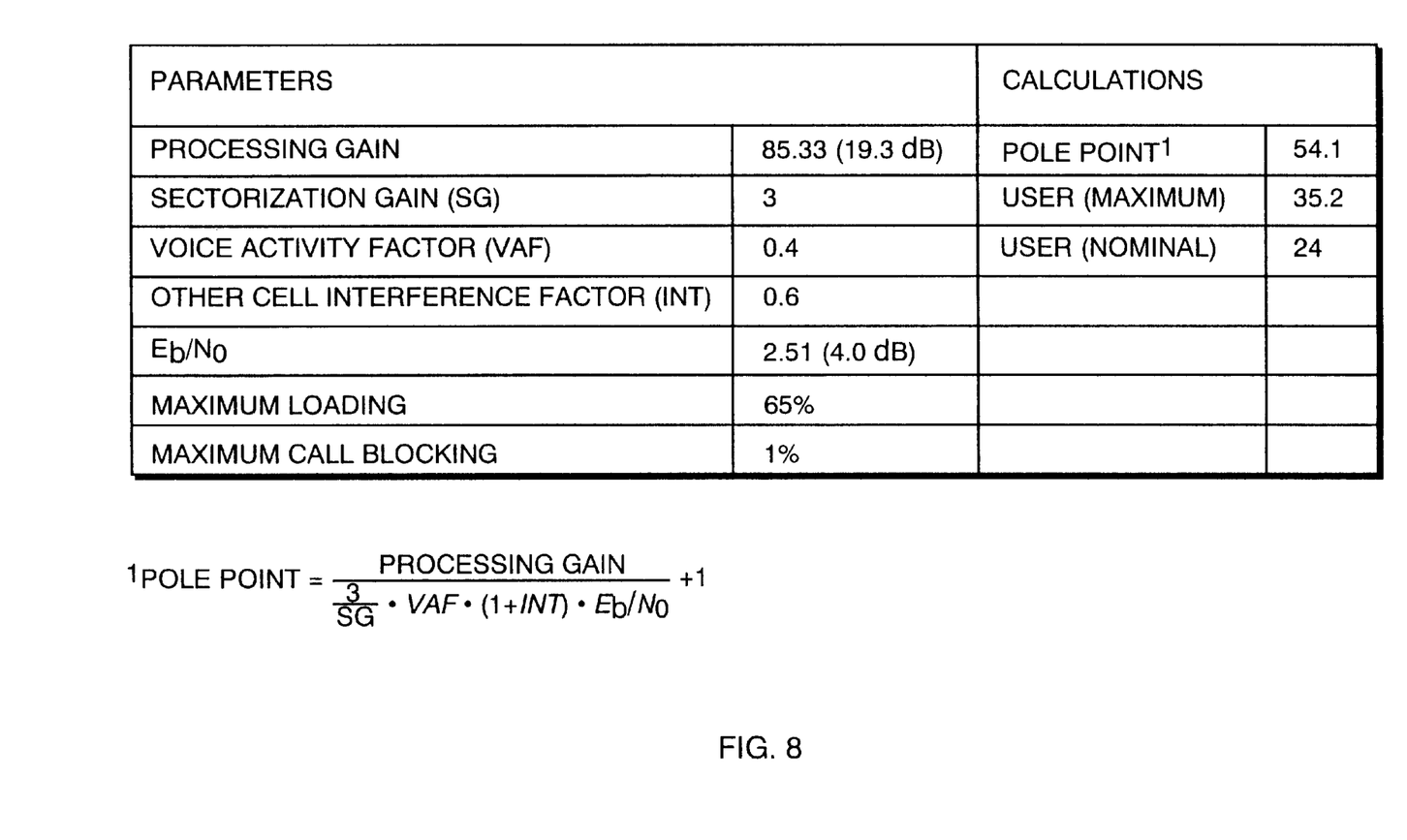
FIG. 8 is a table illustrating how capacity can be increased using the invention.

The table in FIG. 8 is an illustration of the parameters and calculations made to determine a number of simultaneous calls which may be supported per microcell. The justification for using the lower 4 dB signal power ($E_b/N_0$) is based on the discussion above in the expected Ricean fading environment. Because of the low expected mobility of users in an in-building environment and because of propagation line-of-sight factor from the leaky coaxial radiators 22, the resulting fading conditions are expected to be much more benign permitting operating at the lower 4.0 dB power level rather than the more traditional 6.0 dB power level.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A wireless communication system in which a plurality of cells are located substantially adjacent one another, the wireless communication system operating over a specified frequency range to provide signals in a forward direction from a central base transceiver station towards subscriber units located in the cells, the system comprising:
    a hub interface converter, for accepting radio frequency signals from at least one base station, the radio frequency signals comprising at least one base station traffic signal modulated onto a radio frequency carrier (RF), for upconverting such radio frequency signals to a transport carrier signal, and for coupling such transport carrier signal as an forward transport signal onto an intercell transport medium;
    a cable microcell integrator, coupled to the intercell transport medium for receiving the forward transport signal, the cable microcell integrator associated with a respective one of the cells, the cable microcell integrator further including a demodulator to translate the forward transport signal to corresponding transmit radio frequency signals; and
    a distribution coaxial cable, coupled to the cable microcell integrator such that the transmit radio frequency signals are radiated in the respective cell as forward link signals using the coaxial cable itself as the energy radiating element;
    the system additionally comprising:
    a power divider, disposed between the cable microcell integrator and the distribution coaxial cable; and
    a second distribution coaxial cable, connected to the power divider, such that the transmit radio frequency signals are radiated from both of the distribution coaxial cables.

2. A system as in claim 1 wherein the intercell transport medium is an optical fiber.

3. A system as in claim 1 wherein the intercell transport medium is a coaxial cable.

4. A system as in claim 1 wherein the cells are divided into sectors, and where cable integrators are deployed in two or more adjacent cell sectors.

5. A system as in claim 1 wherein Code Division Multiple Access (CDMA) is used to modulate the traffic signals onto the radio frequency carrier signals.

6. A system as in claim 1 wherein the cable microcell integrators additionally include modulators for accepting subscriber radio frequency signals as received over the distribution coaxial cable from the subscriber units in a reverse link direction, and for upconverting the subscriber radio frequency signals to a radio frequency carrier signal as a reverse link transport signal coupled to the intercell transport medium.

7. A system as in claim 6 wherein the hub interface converter additionally comprises a demodulator to translate the reverse transport signal to corresponding radio frequency signals within a reverse link bandwidth which are in turn coupled to one or more of the base stations.

8. A system in which a plurality of cells are located substantially adjacent one another, the wireless communication system operating over a specified frequency range to provide signals in a forward direction from a central base transceiver station towards subscriber units located in the cells, the system comprising:
    a hub interface converter, for accepting radio frequency signals from at least one base station, the radio frequency signals comprising at least one base station traffic signal modulated onto a radio frequency carrier (RF), for upconverting such radio frequency signals to a transport carrier signal, and for coupling such transport carrier signal as an forward transport signal onto an intercell transport medium;
    a cable microcell integrator, coupled to the intercell transport medium for receiving the forward transport signal, the cable microcell integrator associated with a respective one of the cells, the cable microcell integrator further including a demodulator to translate the forward transport signal to corresponding transmit radio frequency signals; and
    a distribution coaxial cable, coupled to the cable microcell integrator such that the transmit radio frequency signals are radiated in the respective cell as forward link signals using the coaxial cable itself as the energy radiating element;
    wherein the cable microcell integrators additionally include modulators for accepting subscriber radio frequency signals as received over the distribution coaxial cable from the subscriber units in a reverse link direction, and upconverting the subscriber radio frequency signals to a radio frequency carrier signal as a reverse link transport signal coupled to the intercell transport medium; and
    the system additionally comprising:
    a duplexer, disposed between the distribution coaxial cable and the cable microcell integrators such that both the forward link signals being transmitted to the subscriber units and the reverse link signals being received from the subscriber units travel over a common distribution coaxial cable.

* * * * *